United States Patent [19]
Calafell et al.

[11] 4,146,193
[45] Mar. 27, 1979

[54] FLEXIBLE TAPE RECEIVING AND STORAGE CONTAINER

[76] Inventors: Peter M. Calafell, 17 Clark St., Huntington, N.Y. 11743; Julio Scheimberg, 31 E. Park Dr., Old Bethpage, N.Y. 11804

[21] Appl. No.: 895,633

[22] Filed: Apr. 12, 1978

[51] Int. Cl.² .................................. G11B 15/58
[52] U.S. Cl. .................................. 242/182; 206/527
[58] Field of Search .................... 242/197–200, 242/55.19 A, 76, 182–185; 226/118, 119, 97; 360/93, 132

[56] References Cited

U.S. PATENT DOCUMENTS

| 2,889,491 | 6/1959 | MacDonald | 226/118 X |
| 3,340,369 | 9/1967 | Seidl | 242/55.19 A |
| 3,508,696 | 4/1970 | Taylor | 226/118 X |
| 3,718,301 | 2/1973 | Morton | 242/71.1 |
| 3,966,107 | 6/1976 | Constantini et al. | 226/118 X |

*Primary Examiner*—Leonard D. Christian
*Attorney, Agent, or Firm*—Bauer & Amer

[57] ABSTRACT

A receiving and storage container according to the present invention provides the ability to collect a tape strip and to store the same between a pair of substantially parallel walls and include an opening in the container arranged such that the leading edge of the stored tape is positionally retained proximate the opening so as to render the leading edge of the tape immediately accessible from outside of the container without first having to rewind the tape.

10 Claims, 4 Drawing Figures

U.S. Patent  Mar. 27, 1979  4,146,193
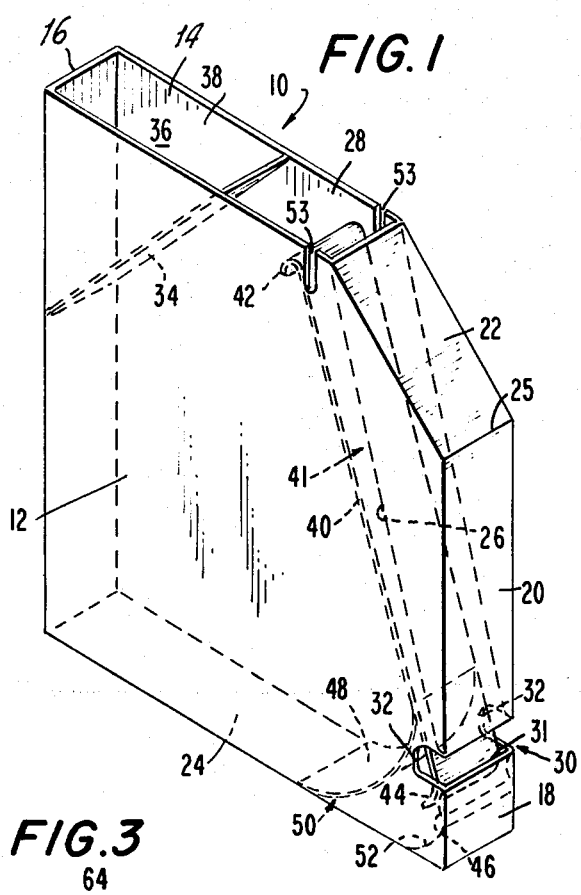
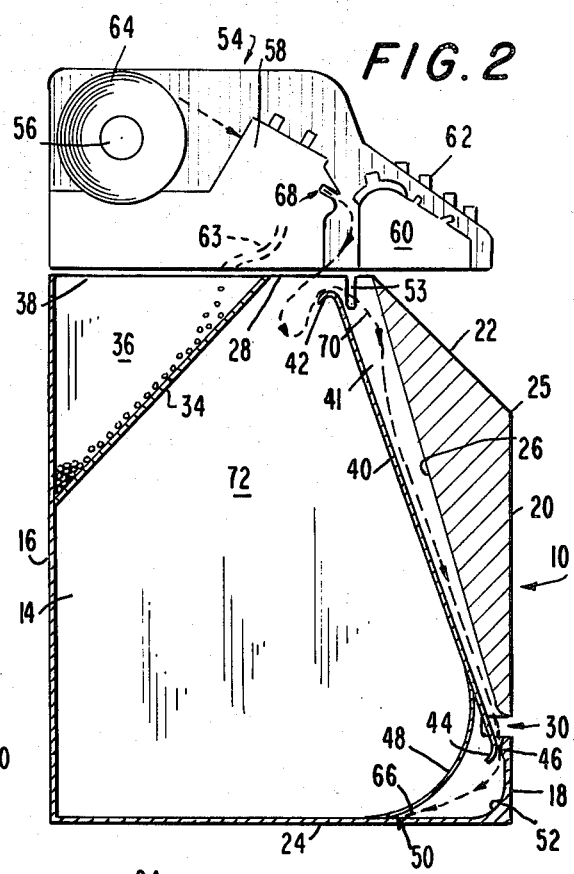
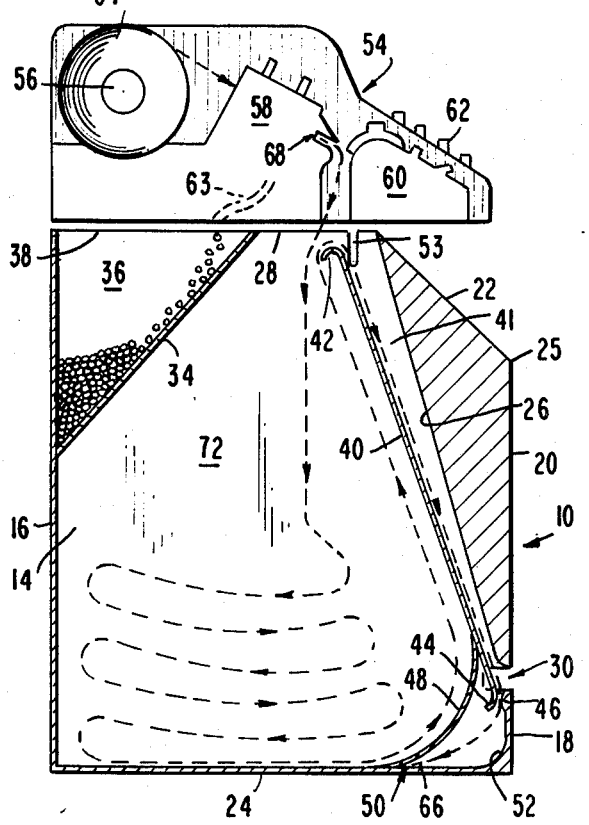
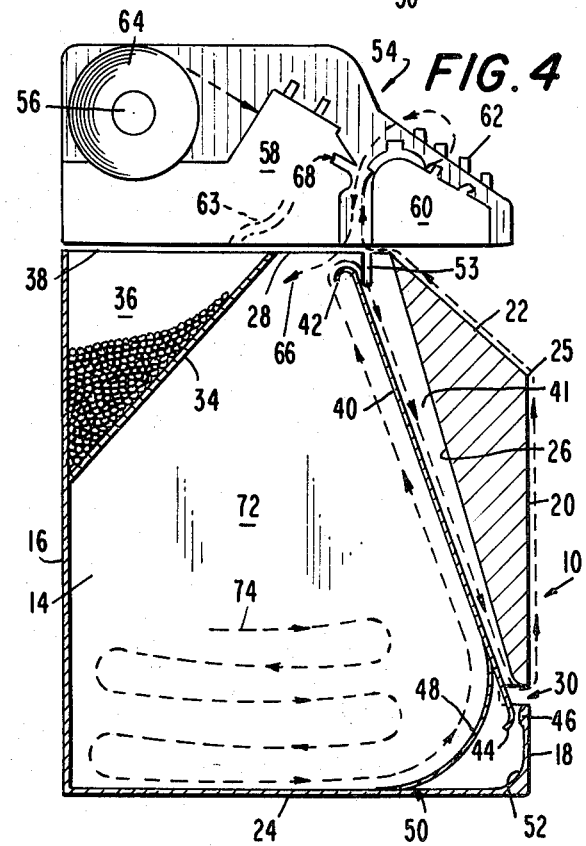

FLEXIBLE TAPE RECEIVING AND STORAGE CONTAINER

BACKGROUND OF THE INVENTION

This invention relates to containers for receiving and storing an elongated strip of flexible material.

Telex machines commonly utilize punched paper tapes for the purpose of sending messages or information between remote locations. An operator first types the message to be sent on a keyboard; the Telex machine simultaneously punches the coded message onto oil-impregnated paper tape which is fed from a blank roll. After the punching of the message has been completed, the information-containing strip of tape is detached from the remainder of the roll and may thereafter be fed into the Telex machine reader for transmission of the message over telephone lines to another machine at a remote location.

As the paper tape leaves the Telex puncher, the present practice is to permit the tape merely to fall to the floor or other underlying surface or into a wastebasket or the like in a random fashion. This sometimes results in the inadvertent folding or tearing of the tape which renders the same unusable for subsequent reading and information transmission. In addition, the oil-impregnated composition of the paper tape facilitates the adherence to and collection on its surface of dust and dirt from the floor or wastebasket and this dust and dirt accumulates in the sensing element of the Telex reader necessitating its frequent cleaning and occasionally fouling or damaging the tape reader mechanism.

Since the punch tape must be fed into the reader in the same order, or direction or sequence in which the same was prepared, it is necessary to locate the leading end or beginning of the tape to enable the reading and information transmission to occur. This manual locating operation can be extremely time consuming where a particularly lengthy strip of tape has been prepared since great care must be taken to insure against any form of damage to the tape strip. Although the use of a reel to initially collect the tape as it leaves the perforator or puncher would substantially obviate problems of accidental mutilation, such reels do not provide access to the beginning of the tape and a separate, time-consuming, rewinding operation would therefore be required in order to prepare the reel-stored tape for reading and data transmission.

It is well known to those skilled in the art to store flexible tape in an accordion-like manner whereby a plurality of overlapping, contiguous, serpentine folds or loops enable a long length or strip of flexible elongated material to be maintained in a small and compact volume of space. In addition to the spatial efficiencies thereby achievable, such a method provides the advantage of storing the tape in a safe and easily retrievable manner that substantially protects the strip against inadvertant or accidental damage during storage or removable operations. The prior art discloses a number of structures for accordion-like storage of both continuous loops and noncontinuous strips or lengths of a flexible tape.

U.S. Pat. No. 2,889,491 to MacDonald is exemplary of such art, disclosing a tape storage bin wherein tape is stored in a serpentine or accordion-like fashion in adjacently positioned storage compartments. However, in the MacDonald apparatus there is no provision for gaining access to either end of the tape strip and no suggestion that such access is either necessary or desirable within the disclosed magnetic tape memory application.

U.S. Pat. No. 3,508,696 to Taylor teaches a tape basket similar to that described in MacDonald. The Taylor structure includes a removable bottom portion or end to enable a user to retrieve the leading edge of the tape for threading the same through a separately-provided exit opening. Initial feeding of tape into the Taylor storage basket, however, requires the user to manually insert into the basket and manipulate therein a "rake-like device" so as to properly position the tape leading edge for subsequent retrieval and prevent initial disruption of the serpentine folding of the stored tape. It is clear that such a manual insertion and manipulation operation would be extremely difficult or impossible for a user to accomplish while he simultaneously punches the Telex message onto the paper tape. Removal of the bottom portion of the Taylor basket to retrieve the tape leading edge and reposition the same for removal would, in addition, be disadvantageously time-consuming and might, without the exercise of a great degree of care, result in disruption in the accordion-like folds of the remainder of the tape and consequent damage thereto.

OBJECTS OF THE INVENTION

It is therefore the desideratum of the present invention to provide a container for receiving an elongated strip or tape of flexible material and for storing the tape in such manner as to render its leading edge immediately and easily accessible from outside the container so as to enable retrieval of the tape from its stored condition in the same order in which the same was received by the container.

It is another object of the present invention to provide such a container that stores the tape in a configuration that substantially prevents inadvertant or accidental tangling, binding, folding, or tearing of the same during its receipt in or withdrawal from the container.

Yet another object of the present invention is to provide a container for receiving a flexible tape such that once the user feeds the leading edge of the tape into the container no further user attention is required until tape storage has been completed.

An additional object of the present invention is to provide such a receiving and storage container having guiding or leading structure which enables the tape to be fed from its stored condition in the container directly to a tape reader or decoder or other device.

A still further object of the present invention is to provide such a tape receiving and storage container that is relatively low in cost and which may be readily and economically manufactured utilizing well-known techniques.

Further objects, features and advantages of the present invention will be more fully appreciated by reference to the following detailed description of a presently preferred, but nonetheless illustrative, embodiment in accordance with the present invention when taken in conjunction with the accompanying drawing.

In the drawing, wherein similar reference characters denote similar elements throughout the several views:

FIG. 1 is a perspective view of a receiving and storage container constructed in accordance with the present invention;

FIGS. 2, 3 and 4 illustrate the sequence in which a strip of tape is received and stored in and subsequently retrieved from the container of FIG. 1. More particularly, FIG. 2 is a side view in section of the container of FIG. 1 in its normal operational position below the adjacent punching and reading stations of a Telex machine wherein the container is shown receiving and storing the first portion of a strip of flexible tape as the same is encoded with information by the Telex tape puncher;

FIG. 3 is a view similar to FIG. 2 but occurring later in time in which the amount of tape stored in the container has substantially increased; and FIG. 4 is a view similar to FIGS. 2 and 3 illustrating how the tape is retrieved from the container and guided directly into the Telex tape reader.

DETAILED DESCRIPTION OF THE PREFERRED EMBODIMENT

Turning now to the drawing, there is shown in FIG. 1 a container according to the present invention for receiving and advantageously storing an elongated strip or tape of flexible material in a manner so as to automatically render the leading edge of the strip immediately accessible for subsequent removal of the tape from the container in the same order in which the tape was earlier received thereby. Although the preferred embodiment of the invention is described and illustrated in conjunction with a paper tape, and more particularly with a paper tape utilized with a Telex information transmitting and receiving device, the present invention should be understood to be equally suitable for use with other flexible media regardless of the ultimate function performed by the media or the apparatus with which the same is to be utilized.

The container, generally designated by the reference numeral 10, is seen in FIG. 1 to be in the form of a thin, irregularly-shaped box-like structure or housing which includes a pair of major surfaces as a front plate or surface member 12 and a back or rear surface member 14 which are held in spaced, substantially parallel relation at a distance slightly greater than the width of the tape to be stored therebetween. The spaced relation of the members 12 and 14 is maintained, and the box-like structure essentially completed, by the side walls 16 and 18, relatively angularly-disposed leading walls or surfaces 20 and 22 and a bottom or base surface 24.

The leading walls 20 and 22 are contiguous along a common edge 25, with the surface 22 receiding inwardly and upwardly, from such common edge 25. The angular relation of the leading walls 20 and 22 may be advantageously configured in the manner shown in FIG. 1 to provide particular ease of removal and subsequent use of the tape from its stored condition, as will be further described hereinafter, when the container 10 is utilized in conjunction with a Telex teletype machine or the like. It should, however, be understood that the particular configuration or angular relation of the leading surfaces 20 and 22 shown in the drawing may be changed or modified therefrom to suit a particular application or use of the container 10 and accordingly should not be construed as a limitation thereon. By way of example, the leading wall 20 could alternatively be angularly positioned on the container 10 to extend upwardly from its lowermost-disposed end in outwardly projecting fashion to its juncture with the other leading wall 22 at the common edge 25 such that the edge 25 defines the outermost projection or side-to-side extension of the container 10 measured from the side wall 16 to the diametrically opposed side thereof. An interior wall or housing member 26 which transversely and spanningly extends between the parallel front and back surfaces 12 and 14 cooperates with the leading walls 20 and 22 to bound an area which may be formed as either a solid or hollow volume depending upon design considerations and the constructional techniques and materials employed in fabricating the container 10.

Thus, it may be seen in FIG. 1 that the container 10 basically comprises a vertically-oriented, free-standing structure having an open top or tape receiving opening 28. Of course, depending upon the particular auxiliary equipment with which it may ultimately be utilized, the container 10 need not stand freely but instead might be provided with a projection or lip (not shown) for supported engagement on a portion of the auxiliary equipment. However, the inclusion of any such structural feature for securing the container 10 forms no part of the present invention and is strictly a matter of design choice. A tape access opening generally designated 30 is also defined between the spaced facing and confrontingly adjacent edges 31 of the side wall 18 and the leading wall 20, and the opening 30 further extends into the parallel front and back members 12 and 14. These extensions 32 of the access opening 30 may be curved or rounded as seen in FIG. 1 or configures in any convenient manner to facilitate the entry through each of the extensions 32 of at least the thumb and forefinger of a user for a purpose that will become clear as this description proceeds. If desired, the excess opening extension 32 in the back member 14 may be eliminated so as to provide the single extension 32 in the front member 12. Such an arrangement may well be necessitated by the operative positioning of the container 10 relative to the particular tape punching device or other auxiliary equipment with which the container 10 is utilized where such positioning would render an extension 32 provided in the back member 14 inaccessible.

The container 10 may be further provided with a partitioning member 34 transversely spanning the major surfaces 12 and 14 to set off and define an auxiliary holding or collecting chamber 36 between the member 34 and a portion of the side wall 16. Access to the chamber 36 is provided by way of an opening 38 along at least a portion of the length of the top or upwardly-disposed end thereof. If desired, the collecting chamber 36 may be fabricated as a separate unit (not shown) positioned in supported relation on the container 10 by any conventional and convenient engaging and disengaging means so as to enable its removal therefrom for reasons that will become evident hereinafter.

A tape guide, shown as a wall 40, transversely spans the distance between the major surfaces 12 and 14 to connect the same and to divide or separate the housing into adjacent, co-planar compartments on either side of the guide 40. Thus, in conjunction with the member 26, the tape guide 40 forms a downwardly tapered tape-directing passage 40 therebetween. The tape guide 40 includes at its upwardly oriented end or termination an arcuate support lip 42 curved away from the member 26 and positioned below the tape receiving opening 28 so as to position the lip 42 within the interior of the container 10.

At its opposite end, the tape guide 40 extends through the area of the access opening extensions 32 and terminates within the container 10 adjacent the side wall 18 in an arcuate end portion 44. The curvature of the end portion 44 is directed away from the side wall 18 and may be of a lesser curvature than that of the lip 42. An arcuate protrusion 46 positioned on the interior surface of the side wall 18 adjacent the access opening 30 and contiguous with the lower edge 31 cooperate with the tape guide 40—and more particularly with the end portion 44 thereof—to prevent the advancing leading edge of the tape from being inadvertently diverted outward through the access opening 30 and out of the container 10.

It should be clear that the cooperating combination of the curved tape guide end portion 44 and the arcuate protrusion 46 on the side wall 18 merely represents one arrangement of structure designed to prevent the advancing leading edge of the tape from being inadvertently fed out of the container 10 through the access opening 30 during the tape storage operations which will be described hereinafter. Naturally, other structural arrangements could be provided within the scope of the invention. Thus, by way of example only, the side wall 18 could be provided with an arcuate recess or bevelled edge or the like in place of the arcuate protrusion 46 to direct the tape leading edge and the tape guide end portion 44 cooperatively be provided with a substantially straight, rather than curved, bevelled termination. An important aspect of these cooperating elements, however, whatever their configurations, is the placement of the tape guide end portion 44 below the lowermost defines of the access opening 30, as shown in the drawings, since regardless of the shaping of these elements it remains necessary to guide the tape leading edge to a point below or past the opening 30 before permitting the tape to move freely and unguidedly on its own. This will become apparent as the description proceeds.

An arcuate or smoothly curved upper tape-directing member 48 extends between the tape guide 40 proximate its end portion 44 and the container's bottom surface 24. The narrowing conjoinder of the directing member 48 with the bottom surface 24 forms a retaining means 50, the advantageous operation of which will soon become clear. A similarly smoothly curved lower directing member 52 is provided below the member 48 and spaced therefrom extending between the side wall 18 and the bottom or base surface 24 of the housing for cooperative interaction with the tape so as to guide the same into engagement with the retaining means 50.

The container 10 is further provided with a pair of opposingly positioned side slots 53 at the top of the major surfaces 12 and 14 downwardly extending from the tape receiving opening 28 defined therebetween. The slots 53 are located intermediate the tape guide 40 and the member 26 and extend below the arcuate tape guide support lip 42 for enabling the leading edge of the tape to be initially directed into the container 10 in a manner that will initiate the tape-receiving sequence which automatically results in proper storage of the tape strip. Alternatively only a single slot 53 may be provided on one of the major surfaces 12 or 14, although the inclusion of a single slot 53 instead of an opposingly positioned pair thereof as shown has absolutely no effect on the operation or use of the inventive container 10.

Operation and use of the inventive container 10 can best be understood by reference to FIGS. 2 through 4, wherein the inventive container 10 is shown in its normal operational position below the adjacent punching and reading stations of a standard Telex machine. The portion of the Telex machine shown, designated generally by the reference numeral 54, comprises a spindle 56, a tape puncher or perforator 58, a tape reader 60 and manual keyboard 62. A conduit or tube 63 (illustrated in broken lines) is also provided through which the punchings or pieces of paper resulting from perforations made in the tape are carried away from the tape punch 58 for disposal. In the past, such perforation remains were generally either permitted to merely fall onto the floor or were collected in a chad box mounted beneath the machine 54.

Referring to FIG. 2, a roll 64 of blank or unpunched paper tape is initially positioned on the spindle 56 and the beginning or leading edge or end of the tape is fed into the punch 58 to ready the same for tape encoding. As the message or data is manually typed on the keyboard 62, the perforator 58 encodes the information onto the tape by punching a series of selectively positioned holes therein. The tape is drawn from the roll 64 as needed and the beginning or leading edge 66 of the tape leaves the tape punch 58 and the exit opening 68 thereof. When a sufficient length of tape, generally a few inches, has been punched to enable the same to enter the container 10, the leading edge 66 is inserted into the housing 10 through one of the side slots 53. Insertion through one of the slots 53 insures that the leading edge 66 of the tape 64 will initially follow a path along the narrowing tapered directing passage 41 formed between the tape guide 40 and the interior surface member 26.

As the tape leading edge 66 advances into the interior of the container 10, it is thus caused to follow along the face of the tape guide 40. The tapered passage 41 formed between the guide 40 and the member 26 directs the moving, leading edge 66 of the tape 64 further downward past the access opening 30 and over the protrusion 46 which is positioned, in conjunction with the arcuate guide end portion 44, to prevent the advancing tape edge 66 from being inadvertently directed out of the container 10 through the access opening 30.

The leading edge 66, continuing to advance, next moves toward the base 24 of the housing along the lower directing member 52 which steers and guides the same into contact with the edge retaining means 50 formed between the base surface 24 and the upper directing member 48. As the leading edge moves beneath the curve 48 it is guided into abutment with narrowing retaining means 50 where it is stopped and frictionally held by the retaining means. Thus, the retaining means 50 stops the leading edge 66 and prevents its further forward movement. This position is seen in FIG. 2. It may be noted at this point that since further forward movement of the leading edge 66 is not possible by virtue of its engagement with the retaining means 50, the portion of the tape adjacent such leading edge 66 is likewise prevented from moving. As a consequence, the tape portion located adjacent the access opening 30 will be positioned as shown in FIG. 3 for subsequent access through the opening 30 from outside the container 10 in a manner to be described hereinafter.

When once the leading edge 66 stops in its travel, further feeding of the tape from the puncher or perforator 58 through the top receiving opening 28 causes this tape to bulge outwardly to the right in FIG. 2 as at 70 against the member 26. Thereafter further feeding of the tape causes it to bow upwardly around the upper lip 42 of the tape guide 40 in the manner shown. The advancing tape 64 winds over the support lip 42 and, after a sufficient amount of tape is fed into the container 10, it rides downwardly over the lip 42 and along the back of the guide 40 and along the upper directing member 48 to lay along the housing bottom surface 24 as seen in FIG. 3 and as shown by the arrow-headed broken lines to assume the serpentine or accordion folds.

Referring now to FIG. 3, the continued downward entry of the tape strip 64 into the main storage chamber 72 causes the tape strip to form a first loop over itself at the side wall 16 and thereafter to assume a serpentine accordion folding back and forth under the action of gravity forming oppositely facing loops or folds within the chamber 72. The accordion-like folding movement positions the tape 64 in contiguous, superposed loops as successive layers of tape freely fall on top of those below and build up to occupy the storage chamber 72 formed between the major surfaces 12 and 14.

After the punching or encoding of the tape 64 has been completed, the same is torn off at its trailing edge 74 as it exits at 68 from the punch or perforator 58. The tape trailing end 74 is then permitted to merely fall into the top of the container 10. It can be appreciated that the encoded tape 64 has thus been easily and efficiently received and automatically stored in a non-destructive manner and in a minimal amount of space. In addition, and as will soon be described, the tape is immediately available for removal from its stored condition from the housing 10 in the same order and direction in which it was encoded and received by the container.

As the tape 64 is encoded in the punch 58, the chad or paper perforations which are punched or removed from the tape are directed via the conduit 63 out of the Telex machine 54. These perforations may be collected in the auxillary holding chamber 36 by suitably positioning the end of the tube 63 relative thereto or by appropriately positioning the chamber 36 below the end of the tube 63 to permit the paper punchings or fragments to enter the chamber 36 through its upward opening 38. When the chamber 36 is filled or when encoding has been completed, the chamber 36 may be emptied and the perforations discarded in the wastebasket.

The ability to withdraw the tape from the container 10 in the same direction or order as originally received thereby is accomplished by the advantageous positioning of the lowermost portion of the tape guide 40 that is accessible at the opposite slots defined in the walls 12 and 14. As a consequence of the structural interarrangement of these and other features of the present invention, a portion of the tape 64 adjacent the leading edge 66 thereof is maintained directly accessible through the slotted sides of the opening 30 so as to enable the retrieval and removal of the leading edge 66 therethrough.

When it is desired for the Telex machine to read or decode the tape for information transmission, the user merely places his thumb and forefinger on opposite sides of the slotted extensions 32 of the access opening 30 and grasps the leading edge 66 of the tape portion accessible therethrough at the sides thereof. The leading edge 66 is then pulled out of the container 10 through the opening 30 and away from its engagement with the retaining means 50.

Referring now to FIG. 4, in order to position the tape for subsequent decoding or reading, the leading edge 66 is pulled from the opening 30 and directed upwardly along the leading wall 20, and further upwardly over the edge 25 and along the relatively slanted leading wall 22 as shown by the arrowheaded broken lines. The tape leading edge 66 is finally manually fed to the tape reader 60 which has its own transport mechanism to pull the tape therethrough for decoding.

Accordingly, once the leading edge 66 is fed into the tape reader 60, the reader 60 pulls the tape out of the container 10 through the opening 30 at the appropriate speed to enable the information to be read. The tape 64 unfolds from within the storage chamber 72 from the bottom portion thereof and follows the tape guide 40 to the access opening 30 through which it is non-destructively withdrawn. The external leading wall surfaces 20 and 22 are advantageously positioned to facilitate the smooth movement of the tape 64 as it moves from its stored condition within the container 10 directly to the reader or decoder 60.

As the tape passes through the reader 60 and is decoded thereby, it may be permitted to fall to the floor or directly into a disposal container (not shown) since its reuse is generally not required. However, should it be necssary to save the tape for any reason, the same may be fed into a similar container 10 in the manner described above or, as shown in FIG. 4, it may be redirected into the main storage chamber 72 of the same container 10 merely to provide the tape with a convenient temporary holding area.

It should be appreciated that the receiving and storage container 10 of the present invention provides the ability to collect a tape such that its leading edge is immediately available for reuse without having to rewind the tape or search through a randomly disposed mass thereof to locate its beginning or leading edge. The container 10 further encompasses the ability to store the remainder of the tape in a particularly advantageous manner which efficiently utilizes a small volume and which significantly reduces the risk of inadvertent damage to or mutilation of the tape during its receipt and storage in or subsequent removal from the container. The leading walls 20 and 22 enable the tape to be fed from the container 10 directly to the reader 58, and the auxiliary holding chamber 36 provides for the temporary retention of the chad or paper perforations resulting from punched encoding of the tape.

While there have been shown and described and pointed out fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. In a storage container for receiving therein an elongated, flexible strip of material fed to the container from the leading edge of the strip and for storing the strip in a manner providing ready access to its leading edge so as to facilitate subsequent removal of the strip from the container, a pair of substantially parallel members held in spaced relation at a distance substantially conforming to the width of the strip and defining between said plates a storage chamber for accommodating the strip in a serpentine arrangement of contiguous, superposed folds, and means in said storage chamber for receiving and retaining the strip leading edge and for enabling access thereto from outside the chamber such that when the leading edge of the strip is fed into the container so that the leading edge is retained by said means and the continued entry of the strip into the container causes the strip to serpentine back and forth forming oppositely facing folds within the storage chamber to efficiently and conveniently store substantially the remainder of the strip of material, the leading edge is positioned so as to enable the fingers of a user to grasp the strip proximate the leading edge thereof for the purpose of removal of the strip from the container in the same order in which the strip originally entered the same.

2. In a storage container according to claim 1, wall means in said chamber and spanningly extending between said pair of members to divide said chamber into first and second adjacent, co-planar compartments, said first compartment being arranged to guide the strip leading edge into engagement with said first mentioned means for retention of the leading edge and to provide access to the same for finger grasping by the user, and said second compartment defining a storage area for holding the said remainder of the strip in serpentine relation as contiguous, superposed folds, and said wall means including an edge portion in said storage chamber along which a portion of the strip is storingly disposed between said first and second compartments for facilitating movement of the strip from said second to said first compartment as the stored strip is removed from said storage container.

3. A container for receiving a length of elongated, flexible tape having a leading edge and for storing the tape therein, comprising:
 wall means defining a storage chamber and including a pair of surfaces spaced apart a distance substantially conforming to the width of the tape;
 divider means spanning said surfaces to define first and second compartments in said chamber;
 an opening in said wall means to enable entry of the tape therethrough for storage of the tape in the container;
 guide means in said first compartment for receiving the tape leading edge and for retention of the same;
 means in said second compartment for directing the tape into contiguous, superposed loops to storingly position the tape in serpentine arrangement therein;
 and means on said wall means for enabling access to the tape proximate its leading edge from outside said container for sequential removal of the tape therefrom.

4. A container according to claim 3, said divider means having an end portion intermediate said first and second compartments and for guiding the tape therebetween as the same is sequentially removed from the container through said access enabling means.

5. A container according to claim 4, said access enabling means being an access opening defined in said wall means and communicating with said first compartment through which a user may grasp the tape proximate its leading edge and pull the same therethrough so as to permit the remainder of the tape to be sequentially removed from the container through said access opening.

6. A container according to claim 3, further comprising a third compartment separate from said first and second compartments and entry means in said wall means communicating with said third compartment to receive and retain waste material resulting from the perforation encoding of the tape received in said first and second compartments.

7. A container according to claim 3, said first compartment including a tapered tape passage for guiding said tape leading edge into retained engagement with said guide means and for storingly positioning a portion of said tape proximate its leading edge adjacent said access enabling means.

8. A container for storing an elongated strip of flexible tape fed thereto from the tape leading end prior to decoding by a tape reader, said container comprising:
 a tape storage chamber including a pair of substantially parallel, vertically-disposed major walls spaced apart a distance substantially conforming to the width of the tape and a base surface connecting said major walls and forming a part of said container;
 a tape receiving opening at the top of said container through which the tape is fed into said storage chamber;
 a separating member connecting said major walls and extending upwardly from said base surface at one end to its oppositely disposed end positioned within said storage chamber adjacent to and below said tape receiving opening, said separating member dividing said storage chamber into first and second compartments and providing for movement of the tape therebetween along said oppositely disposed end, and said separating member cooperating with said base surface at its extension from the base surface to stop and retain the tape leading edge in its forward movement as the tape is fed into said storage chamber and to retain the leading edge so as to predeterminately position a portion of the tape adjacent its leading edge in said first compartment and facilitate the directed movement of the remainder of the tape into said second compartment as the tape is continuously fed into the container;
 means in said second compartment for causing the remainder of the tape to assume a substantially serpentine arrangement for storage of the same therein;
 a tape access opening selectively positioned in said container and communicating with said first compartment, the selective positioning of the access opening enabling access to the tape portion adjacent its leading edge from outside the container;
 and leading wall means on the outside of said container external to said first and second compartments for supportedly guiding the tape from the access opening and directly to the reader.

9. A container according to claim 8, said leading wall means comprising a pair of surfaces angularly contiguous with one another so as to facilitate the supported guidance of the tape from said access opening and directly to the tape reader.

10. A container according to claim 8, further comprising an auxiliary storage compartment in said housing external to said first and second compartments and having an opening through which waste material resulting from perforating the tape may be received in said auxiliary compartment from outside said container.

* * * * *